(12) United States Patent
Duggan

(10) Patent No.: US 6,183,386 B1
(45) Date of Patent: Feb. 6, 2001

(54) DIFFERENTIAL CONTAINING RHEOLOGICAL FLUID

(75) Inventor: James A. Duggan, Temperance, MI (US)

(73) Assignee: Dana Corporation, Toledo, OH (US)

( * ) Notice: Under 35 U.S.C. 154(b), the term of this patent shall be extended for 0 days.

(21) Appl. No.: 08/775,045

(22) Filed: Dec. 27, 1996

(51) Int. Cl.[7] .................................................. F16H 37/06
(52) U.S. Cl. ............................. 475/84; 475/86; 192/21.5
(58) Field of Search .............................. 192/21.5; 475/84, 475/86, 231

(56) References Cited

U.S. PATENT DOCUMENTS

| 2,983,349 | | 5/1961 | Meiklejohn | 192/21.5 |
|---|---|---|---|---|
| 4,444,298 | * | 4/1984 | Stangroom | 192/21.5 |
| 5,007,513 | * | 4/1991 | Carlson | 192/21.5 |
| 5,054,593 | | 10/1991 | Carlson | 475/84 |
| 5,090,531 | | 2/1992 | Carlson | 475/86 |
| 5,147,252 | | 9/1992 | Mace et al. | 192/21.5 |
| 5,322,484 | | 6/1994 | Reuter | 192/21.5 |
| 5,358,084 | * | 10/1994 | Schramm | 192/21.5 |
| 5,452,957 | | 9/1995 | Duggan | 192/21.5 |
| 5,598,908 | * | 2/1997 | York et al. | 192/21.5 |
| 5,657,829 | * | 8/1997 | May | 180/197 |
| 5,779,013 | * | 7/1998 | Bansbach | 192/21.5 |
| 5,823,309 | * | 10/1998 | Gopalswamy et al. | 192/21.5 |
| 5,845,753 | * | 12/1998 | Bansbach | 192/21.5 |
| 5,848,678 | * | 12/1998 | Johnston et al. | 192/21.5 |
| 5,915,513 | * | 6/1999 | Isley, Jr. et al. | 192/21.5 X |

* cited by examiner

*Primary Examiner*—Khoi Q. Ta
(74) *Attorney, Agent, or Firm*—MacMillan, Sobanski & Todd, LLC

(57) ABSTRACT

A vehicle differential includes a case which is rotatably supported within an axle housing. The case is formed having a center wall which divides the interior of thereof into first and second fluid chambers. The ends of a pair of axle shafts extend into the case and respectively within the fluid chambers. Each of the fluid chambers is filled with a rheological fluid. Respective electromagnetic coils are disposed within or adjacent to each of the fluid chambers. An electronic controller is provided for supplying electrical current to each of the electromagnetic coils in response to sensed operating conditions of the vehicle, such as rotational speed and torque of the axle shafts. By varying the magnitude of the electrical current supplied to the electromagnetic coils, the strength of the magnetic field applied to the rheological fluid contained in each of fluid chambers can be varied. As a result, the resistance to flow or shear of the rheological fluid, which affects the amount of torque which is transmitted from the rotatably driven case to each of the axe shafts, can be varied in response to the operating conditions of the vehicle.

13 Claims, 3 Drawing Sheets

DIFFERENTIAL CONTAINING RHEOLOGICAL FLUID

BACKGROUND OF THE INVENTION

This invention relates to a differentials for vehicles and in particular to an improved structure for a vehicle differential which uses a rheological fluid to control the operation of the differential during use.

Differential gear mechanisms, commonly referred to as differentials, are well known devices which are used in the drive train systems of most vehicles. The differential is usually connected between an input driving shaft (typically a drive shaft assembly which is rotated by an engine of the vehicle) and a pair of output driven shafts (typically a pair of axles connected to the wheels of the vehicle). The differential is designed to distribute torque from the input shaft to the two output shafts, while permitting the two output shafts to rotate at different speeds under certain conditions. When the vehicle is operated in a straight line, the wheels of the vehicle turn at the same speed, and torque is distributed equally by the differential to the two wheels. When the vehicle negotiates a turn, the outside wheel rotates at a somewhat faster speed than the inside wheel. As a result, although torque is continued to be supplied to both wheels, a somewhat greater amount of torque is supplied to the inside wheel than to the outside wheel.

A conventional differential employs a number of meshing gears to accomplish the function described above. However, one of the drawbacks of conventional mechanical differentials is that when the vehicle is operated on a slippery surface, most or all of the torque will be distributed to a slipping wheel. For example, when one wheel of the vehicle is on a slippery surface, most or all of the torque will be delivered to that slipping wheel. As a result, the vehicle will become immobilized. To overcome this problem, it is known to provide mechanical differentials with additional mechanisms for limited or selectively preventing differentiation of speed between the two driven wheels. A number of such mechanically actuated limited slip and non-slip differential structures are known, most of which include a friction clutch structure of some type. Unfortunately, such structures are relatively complex and expensive in structure and operation. It would, therefore, be desirable to provide an improved structure for a differential which can be adjusted in accordance with the changing operating conditions of the vehicle.

SUMMARY OF THE INVENTION

This invention relates to an improved structure for a vehicle differential. The differential includes a case which is rotatably supported within an axle housing. The case is formed having a center wall which divides the interior of thereof into first and second fluid chambers. The ends of a pair of axle shafts extend into the case and respectively within the fluid chambers. Each of the fluid chambers is filled with a rheological fluid. Respective electromagnetic coils are disposed within or adjacent to each of the fluid chambers. An electronic controller is provided for supplying electrical current to each of the electromagnetic coils in response to sensed operating conditions of the vehicle, such as rotational speed and torque of the axle shafts. By varying the magnitude of the electrical current supplied to the electromagnetic coils, the strength of the magnetic field applied to the rheological fluid contained in each of fluid chambers can be varied. As a result, the resistance to flow or shear of the rheological fluid, which affects the amount of torque which is transmitted from the rotatably driven case to each of the axle shafts, can be varied in response to the operating conditions of the vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
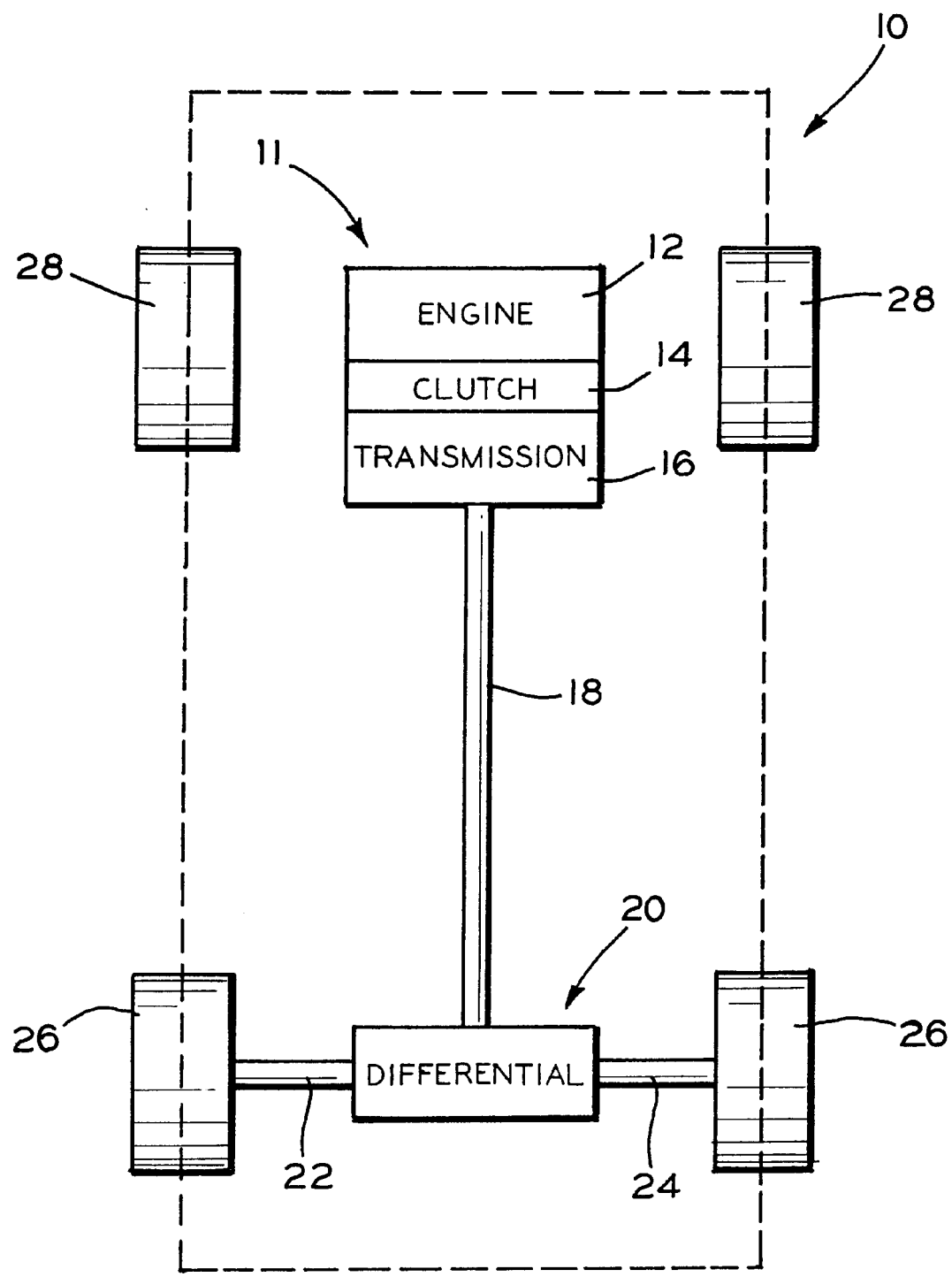
FIG. 1 is a schematic top plan view of a vehicle drive train assembly including a differential in accordance with this invention.

Referring now to the drawings, there is schematically illustrated in FIG. 1 a portion of a vehicle 10 containing a drive train assembly, indicated generally at 11, in accordance with this invention. The drive train assembly 10 includes a conventional engine 12 or other source of rotational power which is connected through a clutch 14 to a transmission 16. The clutch 14 and the transmission 16 are also conventional in the art. The clutch 14 functions to selectively connect the engine 12 to the transmission 16. The transmission 16 contains a plurality of meshing gears of varying size which are selectively connected to provide a desired speed reduction gear ratio. The transmission 16 is connected to a forward end of a drive shaft assembly 18, typically through a universal joint (not shown). The rearward end of the drive shaft assembly 18 is connected, typically through another universal joint (not shown), to a differential, indicated generally at 20. The structure and operation of the differential 20 will be explained in detail below. Briefly, however, the differential 20 is provided to rotatably drive first and second axle shafts 22 and 24 which extend to respective rear wheels 26 of the vehicle 10. In the illustrated rear wheel drive embodiment of the vehicle, a pair of front wheels 28 are provided, but are not rotatably driven. However, it will be appreciated that the differential 20 may be adapted to rotatably drive the front wheels 28 instead of the rear wheels 26. Alternatively, the differential 20 of this invention may be used as an inter-axle differential (commonly known as a transfer case) for rotatably driving the front and rear axles of a four wheel drive vehicle.

Figure 2:
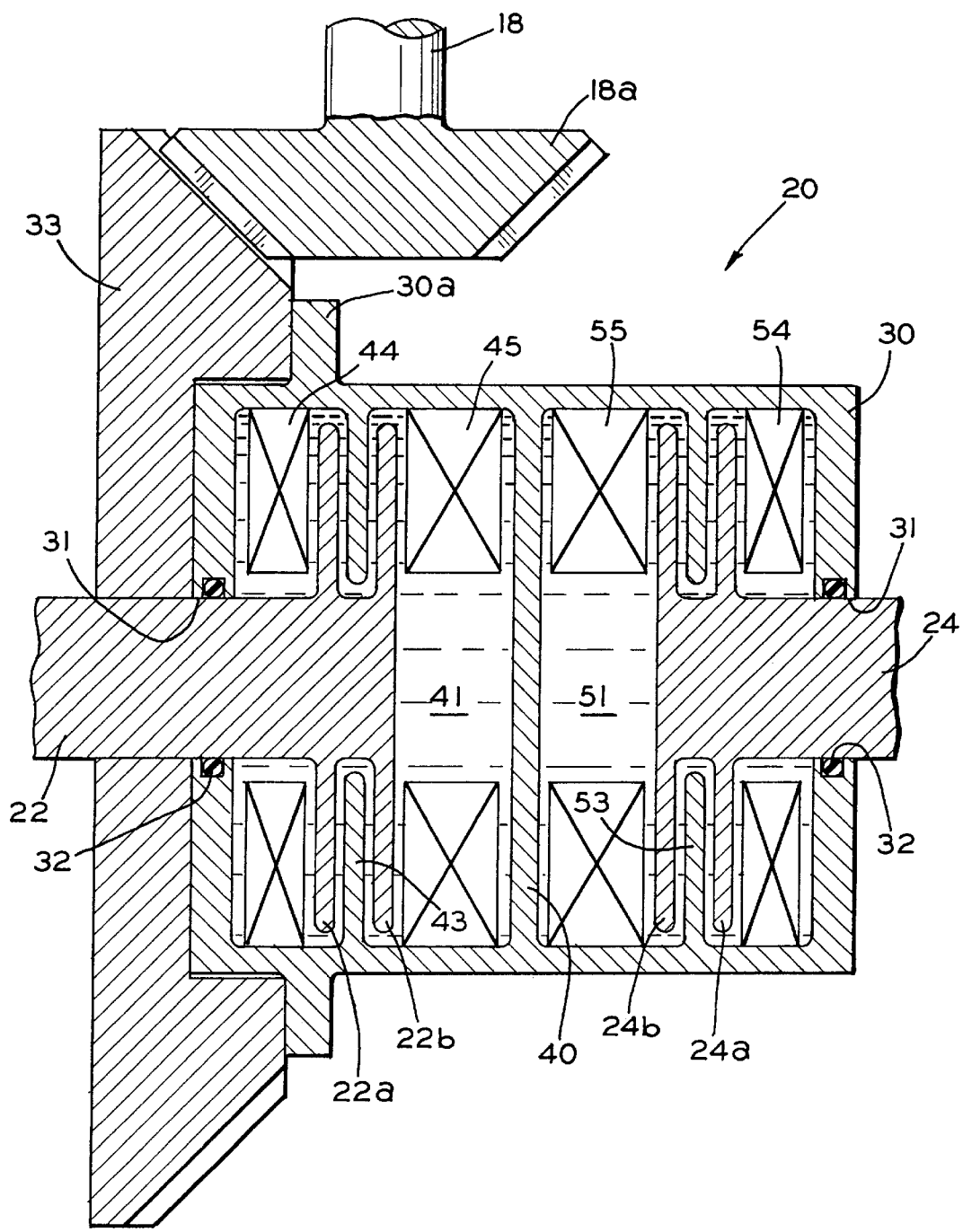
FIG. 2 is a top sectional elevational view of the differential illustrated in FIG. 1.

The structure of the differential 20 is illustrated in detail in FIG. 2. As shown therein, the differential 20 includes a case 30 which is rotatably supported within an axle housing (not shown) in a known manner. The case 30 is hollow and generally cylindrical in shape, having a pair of openings 31 formed through opposed sides thereof. The openings 31 are provided to permit the inner ends of the axle shafts 22 and 24 to extend co-axially therethrough into the interior of the case 30 of the differential 20. Respective annular seals 32, such as 0-rings, are provided within each of the openings 31 to provide a sealing engagement with each of the axle shafts 22 and 24. An annular flange 30a is formed on the exterior of the case 30 of the differential 20. The annular flange 30a is provided to facilitate the connection of a ring gear 33 to the case 30. The ring gear 33 may be secured to the flange 30a of the case 30 by any conventional means, such as by a plurality of threaded fasteners (not shown). The ring gear 33 cooperates with a pinion gear 18a which is connected for rotation with the drive shaft assembly 18. Thus, rotation of the drive shaft assembly 18 causes rotation of the differential 20 about an axis which is co-axial with the axle shafts 22 and 24 in a known manner.

The case 30 is formed having a center wall 40 which divides the interior thereof into first and second fluid chambers 41 and 51. Within the first fluid chamber 41, the case 30 is formed having a first annular plate portion 43 which extends radially inwardly and defines an enlarged central opening. The first annular plate portion 43 divides the first chamber 41 into two fluid sub-chambers which communicate through the central opening thereof First and second electromagnetic coils 44 and 45 are provided in the sub-chambers of the first fluid chamber 41. The purpose of the first and second electromagnetic coils 44 and 45 will be explained below. The inner end of the axle shaft 22 terminates in a pair of annular shear disc portions 22a and 22b. The first shear disc portion 22a extends radially outwardly between the first electromagnetic coil 44 and the first annular plate portion 43 of the case 30. The second shear disc portion 22b extends radially outwardly between the first annular plate portion 43 of the case 30 and the second electromagnetic coil 45.

Similarly, within the second fluid chamber 51, the case 30 is formed having a second annular plate portion 53 which extends radially inwardly and defines an enlarged central opening. The second annular plate portion 53 divides the second chamber 51 into two fluid sub-chambers which communicate through the central opening thereof Third and fourth electromagnetic coils 54 and 55 are provided in the sub-chambers of the second fluid chamber 51. The purpose of the first and second electromagnetic coils 54 and 55 will be explained below. The inner end of the second axle shaft 24 terminates in a pair of annular shear disc portions 24a and 24b. The first shear disc portion 24a extends radially outwardly between the third electromagnetic coil 54 and the second annular plate portion 53 of the case 30. The second shear disc portion 24b extends radially outwardly between the first annular plate portion 53 of the case 30 and the fourth electromagnetic coil 55.

Preferably, the shear disc portions 22a, 22b, 24a, and 24b are each formed from a material having a high purity iron concentration. In the illustrated embodiment, the shear disc portions 22a, 22b, 24a, and 24b are formed integrally with the respective axle shafts 22 and 24. To accomplish this, a cladding of the high purity iron material may be applied on each of the shear disc portions 22a, 22b, 24a, and 24b. However, it will be appreciated that the shear disc portions 22a, 22b, 24a, and 24b may be formed as separate members which are secured to the axle shafts 22 and 24 for rotation therewith. For example, the shear disc portions 22a, 22b, 24a, and 24b may be formed as separate members which are press fit, brazed, welded, splined, bolted, or otherwise secured on the ends of the axle shafts 22 and 24.

Each of the fluid chambers 41 and 51 is adapted to contain a quantity of a suitable rheological fluid. As used herein, a "rheological fluid" is a fluid which exhibits a significant change in its ability to flow or shear upon the application of an appropriate energy field. The rheological fluid may be a magneto-rheological fluid which is responsive to the presence of a magnetic field. Magneto-rheological fluids may be formed of a fluid carrier, such as silicone oil, containing magnetizable particles, such as carbonyl iron. When exposed to a magnetic field, the particles align and reduce the ability of the fluid to flow is freely. The rheological fluid may alternatively be an electro-rheological fluid which is responsive to the presence of an electrical field, such as voltage. A number of such rheological fluids are commonly available.

Means are provided for selectively generating and applying an energy field to the rheological fluid. The specific nature of this means will depend upon the particular type of rheological fluid is selected for use. In the preferred and illustrated embodiment, the rheological fluid is a magneto-rheological fluid. In this instance, the means for selectively generating an energy field is the electromagnetic coils 44, 45, 54, and 55. The electromagnetic coils 44, 45, 54, and 55 may be arranged as illustrated or in any other manner such that when energized, a magnetic field is applied to the magneto-rheological fluid contained within the fluid chambers 41 and 51. The electromagnetic coils 44, 45, 54, and 55 are preferably arranged so that the applied magnetic field is generally uniform over the interior of the chambers 41 and 51 containing the magneto-rheological fluid.

Figure 3:
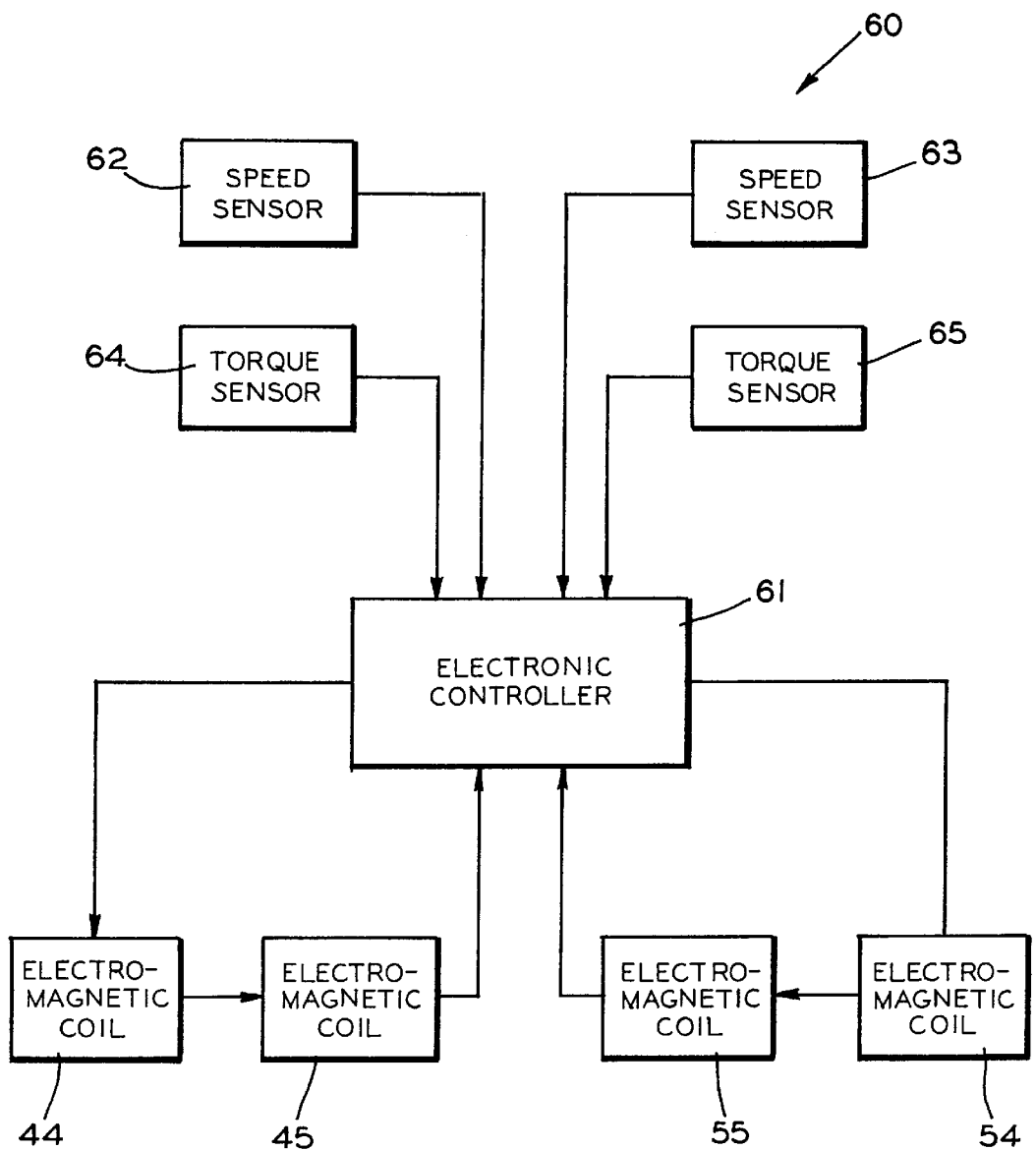
FIG. 3 is a schematic diagram of an electronic control system for use with the differential illustrated in FIGS. 1 and 2.

Referring now to FIG. 3, there is illustrated a schematic diagram of an electronic control system, indicated generally at 60, for controlling the operation of the electromagnetic coils 44, 45, 54, and 55 and, therefore, the operation of the differential 20. The electronic control system 60 includes an electronic controller 61. The electronic controller 61 may be embodied as a conventional microprocessor or similar computing apparatus which can be programmed to generate one or more electrical output signals in response to a plurality of electrical input signals. A plurality of sensors are provided to generate input signals to the electronic controller 61. A first speed sensor 62 is provided which generates an electrical signal to the electronic controller 61 which is representative of the rotational speed of the axle shaft 22. Similarly, a second speed sensor 63 is provided which generates an electrical signal to the electronic controller 61 which is representative of the rotational speed of the axle shaft 24. Alternatively, or in addition to the speed sensors 62 and 63, first and second torque sensors 64 and 65 may be provided which generate respective electrical signals to the electronic controller 61 which are representative of the magnitude of the torque carried by each of the axle shafts 22 and 24.

A first output of the electronic controller 61 is connected to the first and second electromagnetic coils 44 and 45, while a second output of the electronic controller 61 is connected to the third and fourth electromagnetic coils 54 and 55. In the illustrated embodiment, the first and second electromagnetic coils 44 and 45 are connected in series, and the third and fourth electromagnetic coils 54 and 55 are connected in series. However, it will be appreciated that the electromagnetic coils 44, 45, 54, and 55 may be connected to the electronic controller 61 in any known manner. Additionally, the illustrated electromagnetic coils 44, 45, 54, and 55 are shown as being disposed within the rotating case 30 of the differential 20. Conventional slip rings (not shown) or other means may be provided for connecting the electromagnetic coils 44, 45, 54, and 55 to the electronic controller 61. Alternatively, the electromagnetic coils 44, 45, 54, and 55 may be disposed outside of the rotating case 30.

By varying the magnitude of the electrical current supplied to the electromagnetic coils 44, 45, 54, and 55, the strength of the magnetic field applied to the magneto-rheological fluid contained in each of chambers 41 and 51 can be varied. As a result, the resistance to flow or shear of the magneto-rheological fluid, which affects the amount of torque which is transmitted from the rotatably driven case 30 to each of the axle shafts 22 and 24, can be varied. The electronic controller 61 is programmed to be responsive to the input signals generated by the various sensors 62, 63, 64, and 65 for controlling the operation of the electromagnetic coils 44, 45, 54, and 55 and, therefore, the differential 20 as a whole. As discussed above, the differential 20 is designed to distribute torque from the input drive shaft assembly 18 to the two output axle shafts 22 and 24, while permitting the two axle shafts 22 and 24 to rotate at different speeds under certain conditions. This can be accomplished by programming the electronic controller 61 to control the amount of electrical current passing through the electromagnetic coils 44, 45, 54, and 55 in response to the sensed operating conditions of the vehicle.

In operation, the shear disk portions 22a, 22b, 24a, and 24b of the axle shafts 22 and 24 are immersed in the rheological fluid contained with the fluid chambers 41 and 51. When the vehicle is operated in a straight line on a normal surface, electrical current is supplied to each pair of the electromagnetic coils 44, 45, 54, and 55 in equal amounts so as to create magnetic fields of equal strength in each of the fluid chambers 41 and 51. The presence of these electromagnetic fields causes the rheological fluid to exhibit a certain amount of viscosity. As a result, when the case 30 is rotated by the drive shaft assembly 18, the axle shafts 22 and 24 are caused to rotate therewith. Because the viscosity of the rheological fluid is equal in both of the fluid chambers 41 and 51, equal rotational motion and torque is imparted to each of the axles 22 and 24 and, thus, the driven rear wheels 26 of the vehicle.

When the vehicle negotiates a turn or is operated on a slippery surface, the amount of electrical current supplied to each of the electromagnetic coils 44, 45, 54, and 55 can be varied so as to accommodate the rotational speed and torque differential between the left axle 22 and the right axle 24 as necessary. If, for example, the speed or torque signals generated by the sensors 62, 63, 64, and 65 indicate that the right wheel is slipping, the electronic controller 61 may be programmed to reduce or terminate the power being supplied to the electromagnetic coils 54 and 55 associated with the right axle shaft 24. This causes the viscosity of the magneto-rheological fluid contained in the right chamber 51 to decrease, thereby reducing the amount of torque being supplied to the right axle shaft 24. Such operation would facilitate the re-establishment of frictional contact between the wheel 26 associated with the right axle shaft 24 and the surface upon which it is operated. It will be appreciated that the operation of the axle shafts 22 and 24 can be controlled by the electronic controller 61 independently of one another in response to their respective operating conditions.

As discussed above, the illustrated differential 20 includes two shear disc portions 22a and 22b which is secured for rotation with the axle shaft 22 and two shear disc portions 24a and 24b which rotate with the axle shaft 24. It will be appreciated that this invention may be practiced by having only a single shear disc portion secured for rotation with each of the axle shafts 22 and 24. Similarly, if desired, more than two shear disc portions may be secured for rotation with each of the axle shafts 22 and 24. In this instance, it may be desirable to form the case having additional annular plate portions which are interleaved with the shear disc portions to increase the amount of torque which can be transmitted through the differential 20 from the drive shaft assembly 18 to the axle shafts 22 and 24. Also, the electronic controller 61 of the illustrated differential 20 is responsive to the magnitude of speed and torque of the axle shafts 22 and 24. However, it will be appreciated that the electronic controller 61 may control the operation of the differential in response to any other sensed condition of the vehicle, such as turning angle or other parameters.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A differential comprising:

a hollow case defining an interior and adapted for rotation about an axis, said case including an internal wall that divides said interior of said case into first and second fluid chambers, each of said first and second chambers containing a magneto-rheological fluid;

a first output shaft having a first end extending within said first fluid chamber of said case and a second end extending outwardly from said case;

a second output shaft having a first end extending within said second fluid chamber of said case and a second end extending outwardly from said case; and an electromagnet disposed within one of said first and second chambers and formed separately from said wall for selectively applying a magnetic energy field to said magneto-rheological fluid contained within one of said first and second chambers.

2. The differential defined in claim 1 further including a sensor for sensing an operating condition of a vehicle, said electromagnet being controlled by said sensor so as to vary said magnetic energy field in response to said operating condition.

3. The differential defined in claim 2 wherein said operating condition is rotational speed of one of said first and second output shafts.

4. The differential defined in claim 2 wherein said operating condition is torque carried by one of said fist and second output shafts.

5. The differential defined in claim 1 wherein said electromagnet is a first electromagnet for selectively applying a magnetic energy field to said magneto-rheological fluid contained within said first fluid chamber, and further including a second electromagnet for applying an energy field to said second fluid chamber.

6. The differential defined in claim 5 further including a sensor for sensing an operating condition of a vehicle, said first and second electromagnets being controlled by said sensor so as to vary said magnetic energy fields in response to said operating condition.

7. A differential comprising:

a hollow case defining an interior and adapted for rotation about an axis, said case including an internal wall that divides said interior of said case into first and second fluid chambers, each of said first and second chambers containing a magneto-rheological fluid;

a first output shaft having a first end extending within said first fluid chamber of said case and a second end extending outwardly from said case, said first end having a shear disc portion formed thereon;

a second output shaft having a first end extending within said second fluid chamber of said case and a second end extending outwardly from said case, said first end having a shear disc portion formed thereon;

a first electromagnet disposed within said first chamber and formed separately from said wall for selectively applying an energy field to said magneto-rheological fluid contained within said first chamber;

a second electromagnet disposed within said second chamber and formed separately from said wall for selectively applying an energy field to said magneto-rheological fluid contained within said second chamber; and an electronic controller for controlling the operation of said first and second electromagnets.

8. The differential defined in claim 7 further including a sensor for sensing an operating condition of a vehicle, said electronic controller being connected to said sensor so as to control the operation of said first and second electromagnets in response to said operating condition.

9. The differential defined in claim 7 wherein said operating condition is rotational speed of one of said first and second output shafts.

10. The differential defined in claim 7 wherein said operating condition is torque carried by one of said first and second output shafts.

11. The differential defined in claim 7 including a first sensor for sensing an operating condition of said first axle shaft of a vehicle and a second sensor for sensing an operating condition of said second axle shaft of said vehicle, said electronic controller being connected to said first and second sensors so as to independently control the operation of said first and second electromagnets in response to said operating condition.

12. The differential defined in claim 11 wherein said operating condition is rotational speed of said first and second output shafts.

13. The differential defined in claim 11 wherein said operating condition is torque carried by said first and second output shafts.

* * * * *